United States Patent [19]
VanDenberg et al.

[11] Patent Number: 5,540,454
[45] Date of Patent: Jul. 30, 1996

[54] TAG AXLE ASSEMBLY

[75] Inventors: Ervin K. VanDenberg, Massillon; Steven R. Miller, Louisville; Jeffrey A. Russo, Uniontown; David H. Croston, Navarre, all of Ohio

[73] Assignee: Suspensions Incorporated, Canal Fulton, Ohio

[21] Appl. No.: 376,023

[22] Filed: Jan. 20, 1995

[51] Int. Cl.⁶ ................................................. B62D 61/12
[52] U.S. Cl. ........................ 280/81.1; 280/704; 180/209
[58] Field of Search ............................ 280/704, 80.1, 280/81.1, 711, 767, 43, 43.17; 180/209

[56] References Cited

U.S. PATENT DOCUMENTS

| | | | |
|---|---|---|---|
| 4,492,389 | 1/1985 | Wyatt et al. | 280/704 |
| 4,684,142 | 8/1987 | Christenson | 280/81 R |
| 4,705,133 | 11/1987 | Christenson et al. | 180/209 |
| 4,762,421 | 8/1988 | Christenson et al. | 366/54 |
| 4,770,430 | 9/1988 | Lange | 280/81 A |
| 4,812,044 | 3/1989 | Christenson | 366/54 |
| 4,848,783 | 7/1989 | Christenson et al. | 280/405.1 |
| 5,018,755 | 5/1991 | McNeilus et al. | 280/81.1 |

OTHER PUBLICATIONS

Ridewell's Self–Steering Sure–Trac, Ridewell Corp., Springfield, Mo.
LPE–015 Extended Travel Liftaxle Air Suspension, Suspensions Inc.

Primary Examiner—Paul N. Dickson
Attorney, Agent, or Firm—Sand & Sebolt

[57] ABSTRACT

A tag axle assembly has a frame having a pair of hanger brackets, an upper cross tube and a lower cross tube. A pair of rocker beams having a primary pivot for pivotally mounting the rocker beam to the support frame is mounted to the frame. A suspension air spring extends between the upper cross tube and each rocker beam, and a lift air spring extends between each hanger bracket and the front end of the rocker beam. An axle seat is hingedly mounted to the rear end of each rocker beam. An upper beam having an actuator beam and a lift bar are pivotally mounted to the axle seat and to the support frame. A linear actuator extends between the support frame and the actuator beam. Inflation of the lift air spring causes the rocker beams to rotate about the primary pivots, and expansion of the linear actuator causes the actuator beam and the interconnected lift bar to raise. As the interconnected lift bar raises, it applies an upward force to the axle seats such that the axle seats rotate about the hinge pins relative to the rocker beams. Such rotation causes the axle seats to raise further out of the ground engaging position and forward. To move the suspension into ground engaging position, the lift air springs are collapsed, and the effective length of the linear actuator is reduced while simultaneously, the suspension air springs are inflated to carry load.

23 Claims, 6 Drawing Sheets

TAG AXLE ASSEMBLY

BACKGROUND OF THE INVENTION

1. Technical Field

The invention relates generally to an improved auxiliary axle assembly for land vehicles. More particularly, the invention relates to a tag axle assembly attached to the rear end of a truck. Specifically, the invention relates to a tag axle assembly attached to the rear end of the frame of a truck whereby the wheels of the tag axle may be moved between a ground engaging position for increasing the load carrying capacity of the truck, and a non-ground engaging position in which the axle and wheels are positioned adjacent the truck in such a manner that the auxiliary tag axle assembly does not impede the free movement of truck components.

2. Background Information

Transit concrete mixing trucks typically include a frame, a cab for the operator, and a rotatable drum mounted to the frame behind the cab for containing concrete ingredients. Such trucks further typically include a steering axle near the cab, and rear drive axles are often provided in a dual axle arrangement. Trucks of this type often include additional auxiliary axles to assist the drive and steering axles in supporting the truck load. Auxiliary axles of this type may take the form of a pusher axle located ahead of the drive wheels or a tag axle mounted to the rear of the truck. Additionally, it is common for auxiliary axles to be movable between a ground engaging and non-ground engaging position.

In the ground engaging position, the auxiliary axle assists the drive and steering wheels in supporting the truck when it is partially or fully loaded. In the non-ground engaging, or raised position, the axle is moved upwardly and inwardly toward the truck frame such that the wheels associated with the auxiliary axle do not engage the ground, and the auxiliary axle does not assist the drive and steering axles in supporting the truck load. While pusher and tag axles perform primarily the same function, tag axles offer an additional advantage in that the axle may be positioned behind the truck frame, substantially increasing the distance over which the load is supported thereby permitting the truck to carry larger loads.

More specifically, tag axle assemblies are often attached to the rear end of a truck such that when the tag axle is in the ground engaging position, it extends rearwardly of the frame by a significant distance to increase the area over which the load is distributed to the road surface. However, the tag axle must also be conveniently stowed in a non-ground engaging position such that the tag axle assembly does not interfere with the movement of the truck components, and specifically the concrete delivery chutes.

Tag axle assemblies of this type can be an impediment when the vehicle reaches the construction site and must travel over rough, uneven and sometimes muddy or soft terrain. Additionally, tag axle assemblies may include steerable or non-steerable axles. Steerable axles, sometimes referred to as self-steering axles, allow the tire assembly to follow the truck as it negotiates turns by rotating relative to the axle to prevent tire scuffing and increase truck maneuverability. However, steerable axles generally have a caster angle such that the axle is self-steering only when the truck is moving in the forward direction. When the truck moves in reverse, for example, to move the concrete delivery chute adjacent a concrete form, the axle will not steer and the tires will scuff along the ground. Such scuff will damage the tires, and possibly the tag axle assembly. As such, the tag axle must be moved to a non-ground engaging position when the vehicle moves in reverse if the tag axle assembly includes a steerable axle.

Thus, a very important element of any tag axle assembly design is the above described ability to move between ground engaging and non-ground engaging positions. Additionally, when the assembly is in the non-ground engaging position, the assembly should have as much ground clearance as possible to allow the truck to negotiate obstructions at the construction site. Further, the tag axle assembly can not impede the free movement of the concrete delivery chutes.

Specifically, there is a compromise between the desire to elevate the tag axle assembly as high as possible to avoid obstructions and allow the truck to get close to concrete forms and the desire to not raise the tag axle assembly so high that it interferes with the free movement of concrete delivery chutes, etc. Additionally, it is important that the axle is positively secured in the raised position to prevent the tag axle from inadvertently dropping into ground engagement possibly causing property damage or bodily injury.

One drawback of air spring tag axle suspensions is that an air spring is essentially an air inflated bag and requires auxiliary stabilization. An air suspended axle must have separate independent mechanical location and attitude controls and stabilized components or it will not function. Absent stabilization, the air spring will extend to its maximum length or width in the direction of least resistance.

A significant number of air spring suspensions have been developed which to a greater or lesser extent, control axle location and attitude. A number of suspensions that have been developed are roll rigid, others are roll flexible, each generally being designed for specific application. The most common roll rigid configuration is the trailing beam type suspension, most of which use the axle as a torsion bar to provide roll rigidity.

Another type of suspension which has been developed is the parallelogram suspension which is not inherently roll rigid, and does not inherently provide lateral stiffness. While parallelogram suspensions provide the above problems not found in trailing arm type suspensions, they provide the further advantage in that the suspension has an inherent ability to maintain a constant caster angle for caster steering axles which are often utilized in auxiliary tag axle assemblies for trucks.

The parallelogram suspension inherently provides the above advantage, and also locates the axle relative to the longitudinal axis of the vehicle by controlling the forward and rearward motion of the axle relative to the frame. Moreover, a parallelogram suspension also controls the path which the air spring follows as it operates to take up irregularities in the road surface while simultaneously assuring the tire assembly remains at a constant caster angle at all positions in the vertical path of the tire assemblies.

The design of reliable and economical tag axles has become increasingly important in recent years as many governmental agencies enforce road restrictions limiting the amount of weight any vehicle can carry while traversing roads and highways within their jurisdiction. Federal weight laws have a specific formula involving axles, the spacing of axles, and the length of the truck wheel base. Greater loads may, therefore, legally be transported by increasing the number of load bearing axles and/or wheel base to help support the vehicle.

Weight restrictions also have been expressed as a function of the distance between axles such that increasing the distance between axles assures that the truck weight is distributed over a greater road surface area. Many restrictions of this type can be met by increasing the distance between the rearmost axle and the steering axle of the truck by supplying an auxiliary axle assembly which can serve as a rear axle.

Various companies, including McNeilus Truck and Manufacturing, Inc., for example, have patented devices to help vehicles meet load limit restrictions. Specifically, U.S. Pat. Nos. 4,492,389 and 4,762,421 have issued on tag axle assemblies. However, the prior art does not provide the extension available in the ground engaging position of the present invention, while simultaneously providing an extremely compact stowable tag axle assembly when in the non-ground engaging position such that the concrete discharge chutes may be easily maneuvered around the tag axle assembly in both the ground engaging and non-ground engaging assembly. Moreover, none of the existing designs provide the safety provided by the present invention.

Therefore, the need exists for a tag axle assembly movable between a ground engaging and a non-ground engaging position. Moreover, a need exists for such a tag axle assembly in which the tag axle significantly extends the distance between the front steering axle, and the rearmost ground engaging axle, and in which the tag axle assembly is easily stowed on the truck to permit free movement of truck components without interference from the auxiliary tag axle assembly.

SUMMARY OF THE INVENTION

Objectives of the invention include providing a tag axle assembly which may easily be mounted to the rear of a truck.

A further objective is to provide a tag axle assembly which extends the distance between the rearmost axle and the steering axle to increase the load carrying capacity of the truck.

Another objective is to provide a tag axle assembly which is compact in length and in height when in a non-ground engaging position to assure that there is no interference between the tag axle assembly and other vehicle components.

Yet a further objective is to provide a tag axle assembly which articulates when moved from the ground engaging position to the non-ground engaging position.

Still another objective is to provide a tag axle assembly which includes air actuated lift springs to move the wheels out of ground engaging position.

Yet another objective is to provide a tag axle assembly which does not significantly alter the truck's center of gravity when in the non-ground engaging position.

Still a further objective of the invention is to provide a tag axle assembly which secures the axle in the raised position should the lift air springs fail.

A still further objective is to provide a tag axle assembly in which the tie rods and steering stabilizers are positioned forward of the axle.

Still another objective of the invention is to provide a tag axle assembly which is parallelogram stabilized, and maintains a constant caster angle throughout the tire assembly path of travel.

Another objective of the invention is to provide a tag axle assembly with a self-steering axle.

Yet another objective of the invention is to provide an auxiliary tag axle assembly which is of simple construction, which achieves the stated objectives in a simple, effective and inexpensive manner, and which solves problems and satisfies needs existing in the art.

These and other objectives and advantages of the invention are obtained by the improved tag axle assembly of the present invention for mounting on a frame of a vehicle, the general nature of which may be stated as including an assembly frame adapted to be mounted on the vehicle frame; a pair of spaced rocker beams each having a first end and a second end; primary pivot means for pivotally mounting the rocker beams on the assembly frame; an axle seat attached to the second end of each rocker beam; hinge means for hingedly connecting the axle seats on the rocker beams; an axle mounted on and extending between the axle seats; first lift means extending between the assembly frame and the rocker beams for pivotally moving the rocker beams on the assembly frame; suspension spring means extending between the rocker beams and the assembly frame for supporting load; and actuator means operatively connected between the folded or tucked assembly frame and the axle seats for expanding outwardly to move the axle out of the ground engaging position.

BRIEF DESCRIPTION OF THE DRAWINGS

A preferred embodiment of the invention illustrative of the best mode in which applicants have contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
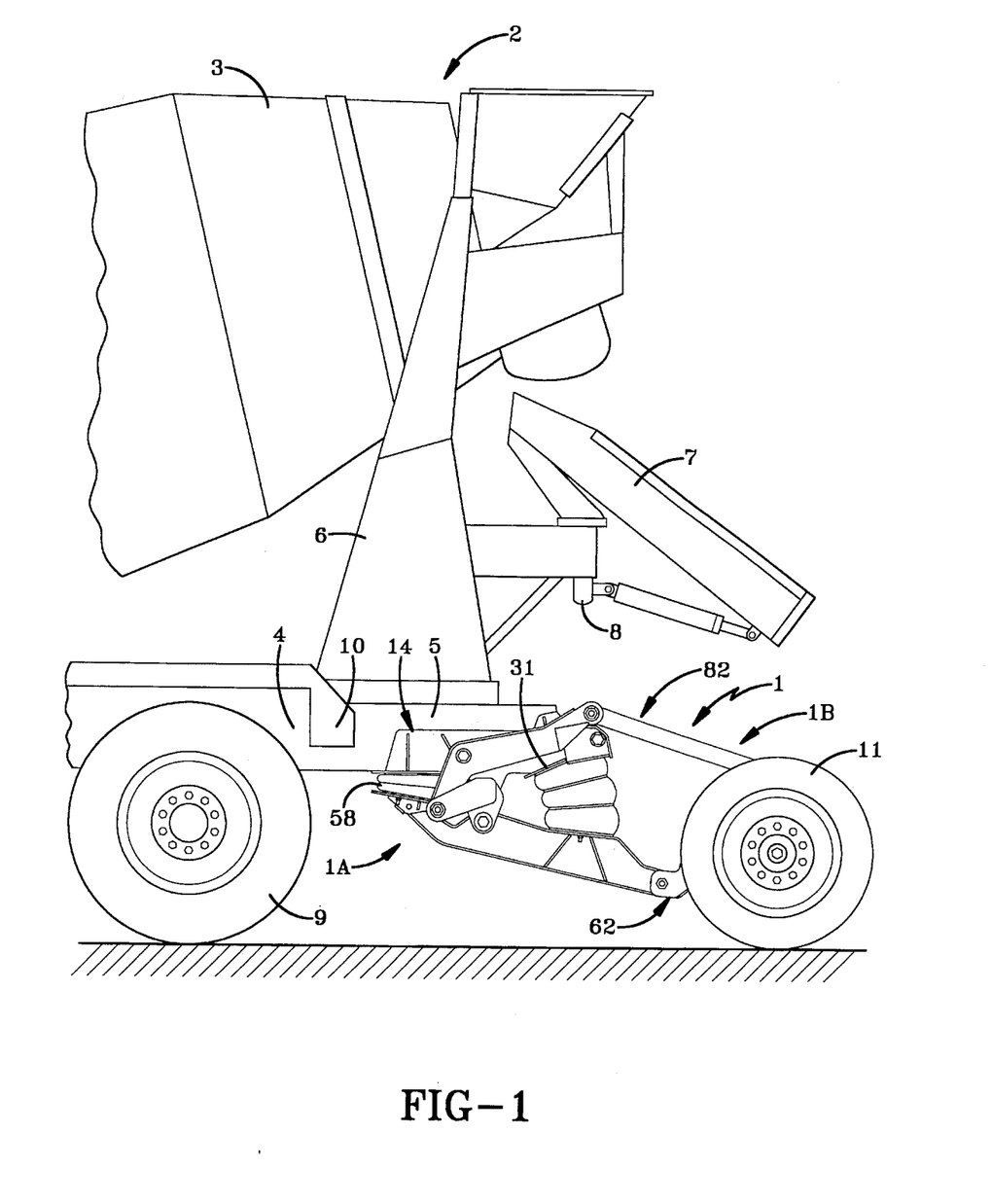
FIG. 1 is a side elevational view of the tag axle assembly attached to the rear portion of a transit cement mixing truck.

The improved auxiliary tag axle assembly of the present invention is indicated generally at 1, and is particularly shown in FIG. 1. Assembly 1 includes a front 1A and a rear 1B and is adapted to be mounted on a vehicle 2, such as a transit cement mixing truck or trailer. Vehicle 2 includes a cement mixing drum 3 supported by a pair of frame rails 4 extending longitudinally along the length of vehicle 2, and having rear portions 5. Vehicle 2 also includes a rear support 6 for supporting cement mixing drum 3, and a cement delivery chute 7 which is pivotally mounted at pivot 8 for movement to the right and left of vehicle 2. Vehicle 2 also includes a pair of rear drive wheels 9, and a pair of fenders 10 extending thereover.

Figure 5:
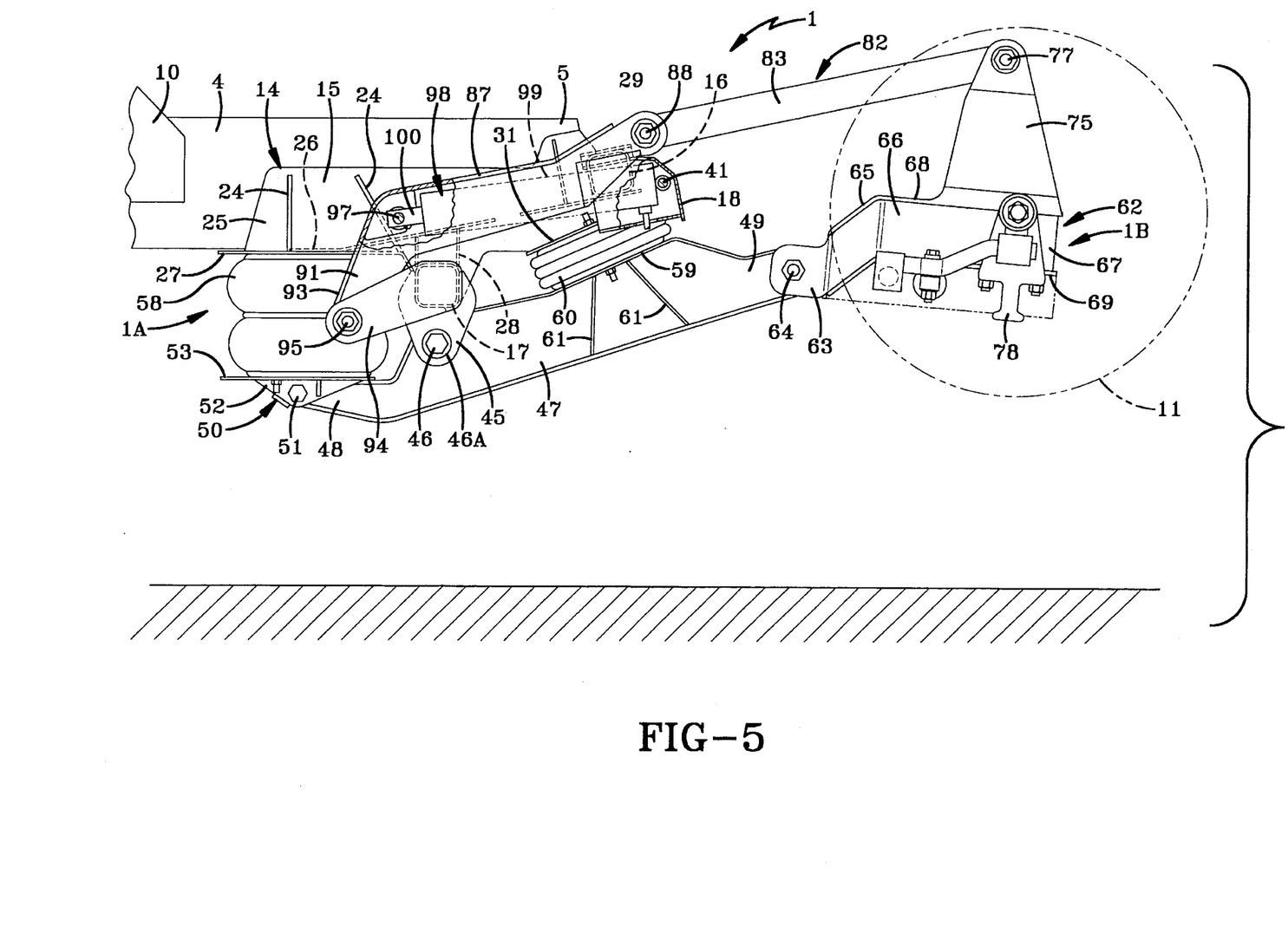
FIG. 5 is a side elevational view of the tag axle assembly of FIG. 2 shown with one of the lift air spring in the inflated position.
Figure 6:
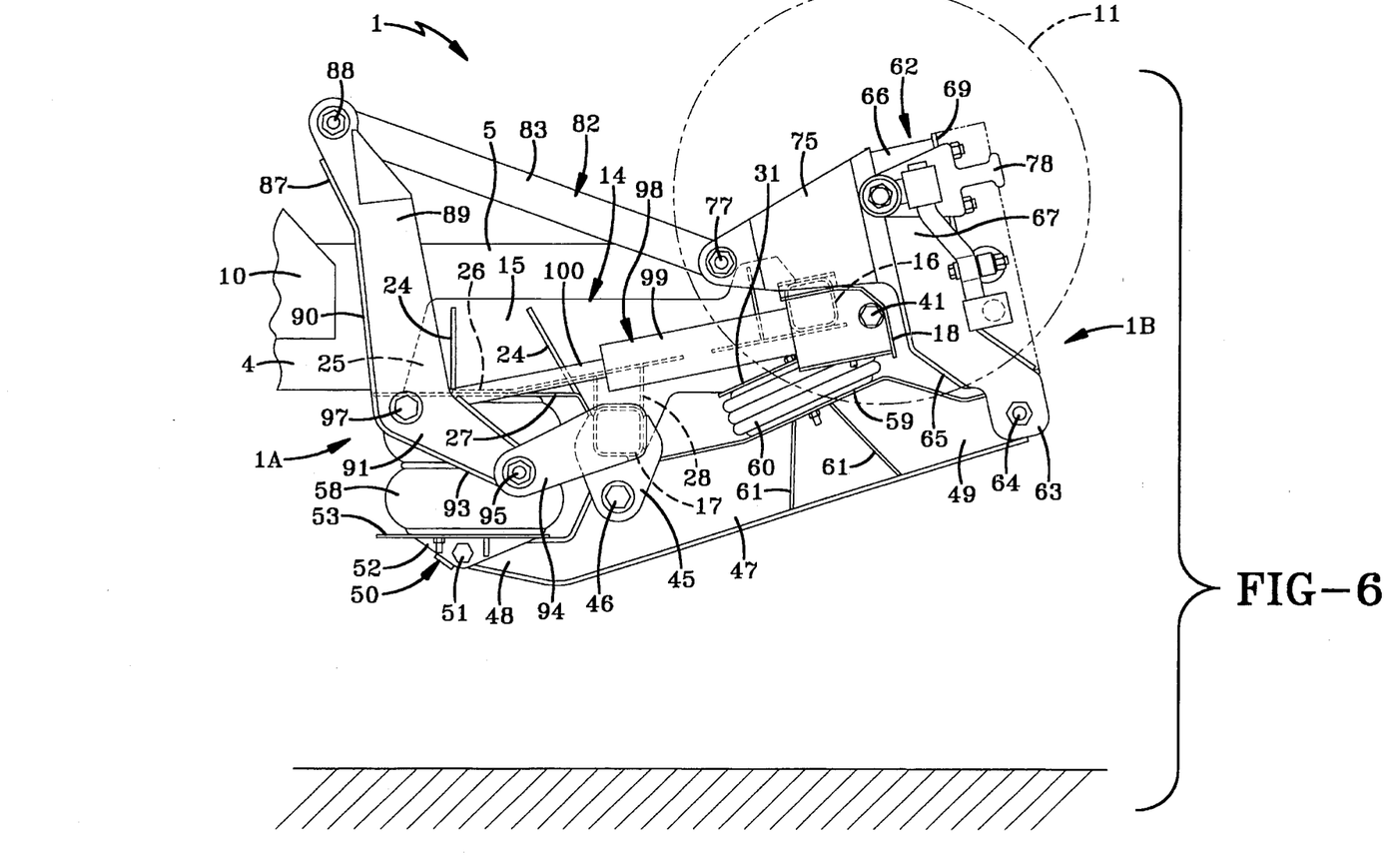
FIG. 6 is a side elevational view of the tag axle assembly of FIG. 5, shown with the actuator expanded and in the articulated non-ground engaging position.

As should be apparent from a review of FIG. 1, tag axle assembly 1 may be mounted to a variety of vehicle types, with transit cement mixing truck 2 being shown in the preferred embodiment. Specifically, tag axle assembly 1 may be utilized with a variety of vehicle types including refuse, dump and flatbed trucks without departing from the spirit of the present invention. Generally, tag axle assembly 1 is movable between a ground engaging position for carrying load and stabilizing vehicle 2 when in forward motion (FIG. 2), a first non-ground engaging position for overcoming obstacles and for permitting vehicle 2 to move in reverse (FIG. 5), and a third non-ground engaging folded position for pouring concrete, and when vehicle 2 is only partially loaded (FIG. 6).

Figure 2:
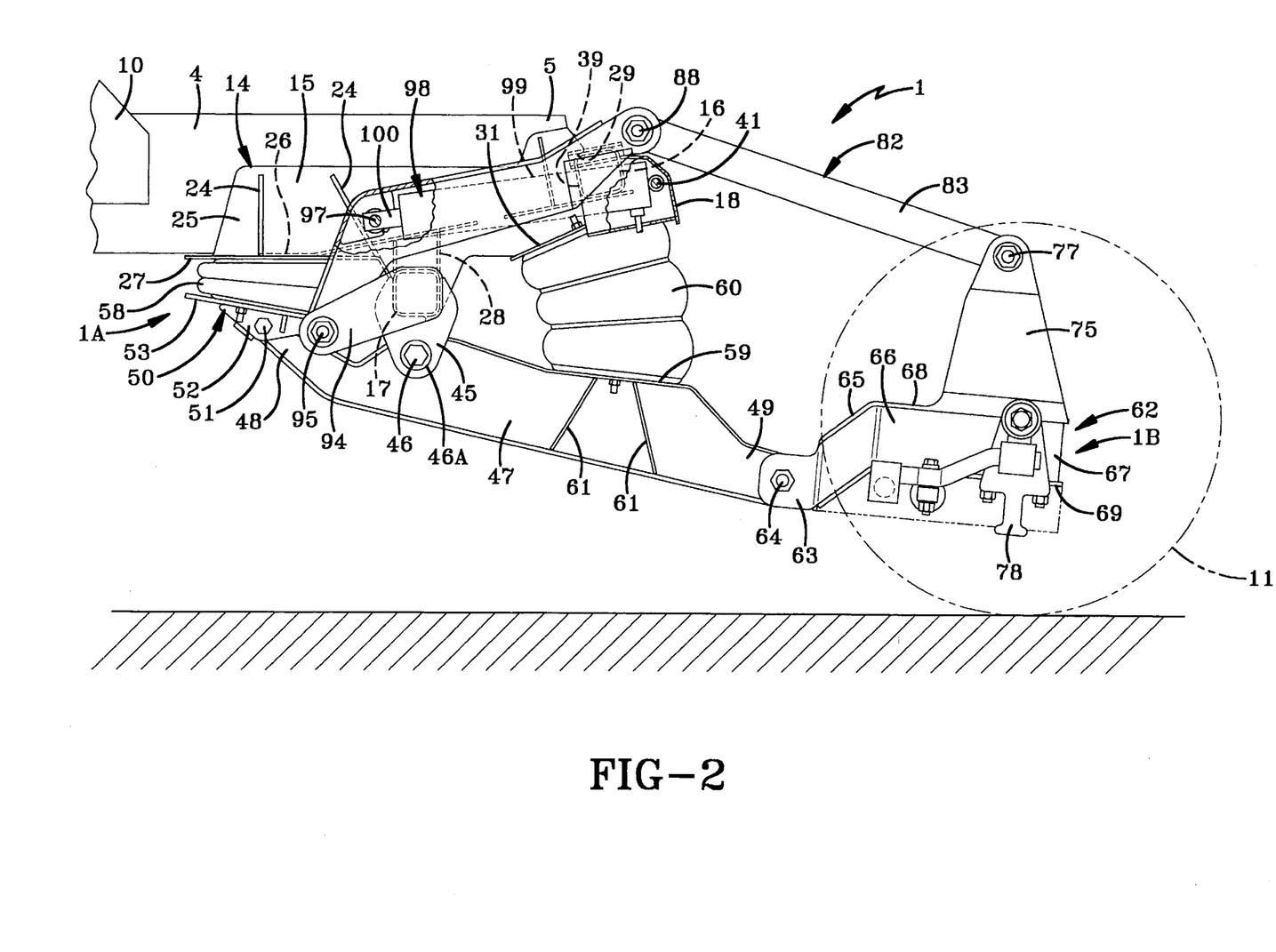
FIG. 2 is a side elevational view of the tag axle assembly in the ground engaging position with portions cut away and in section, and shown attached to the frame of a transit cement mixing truck shown with portions removed, and shown with the tires in dot-dash lines.
Figure 3:
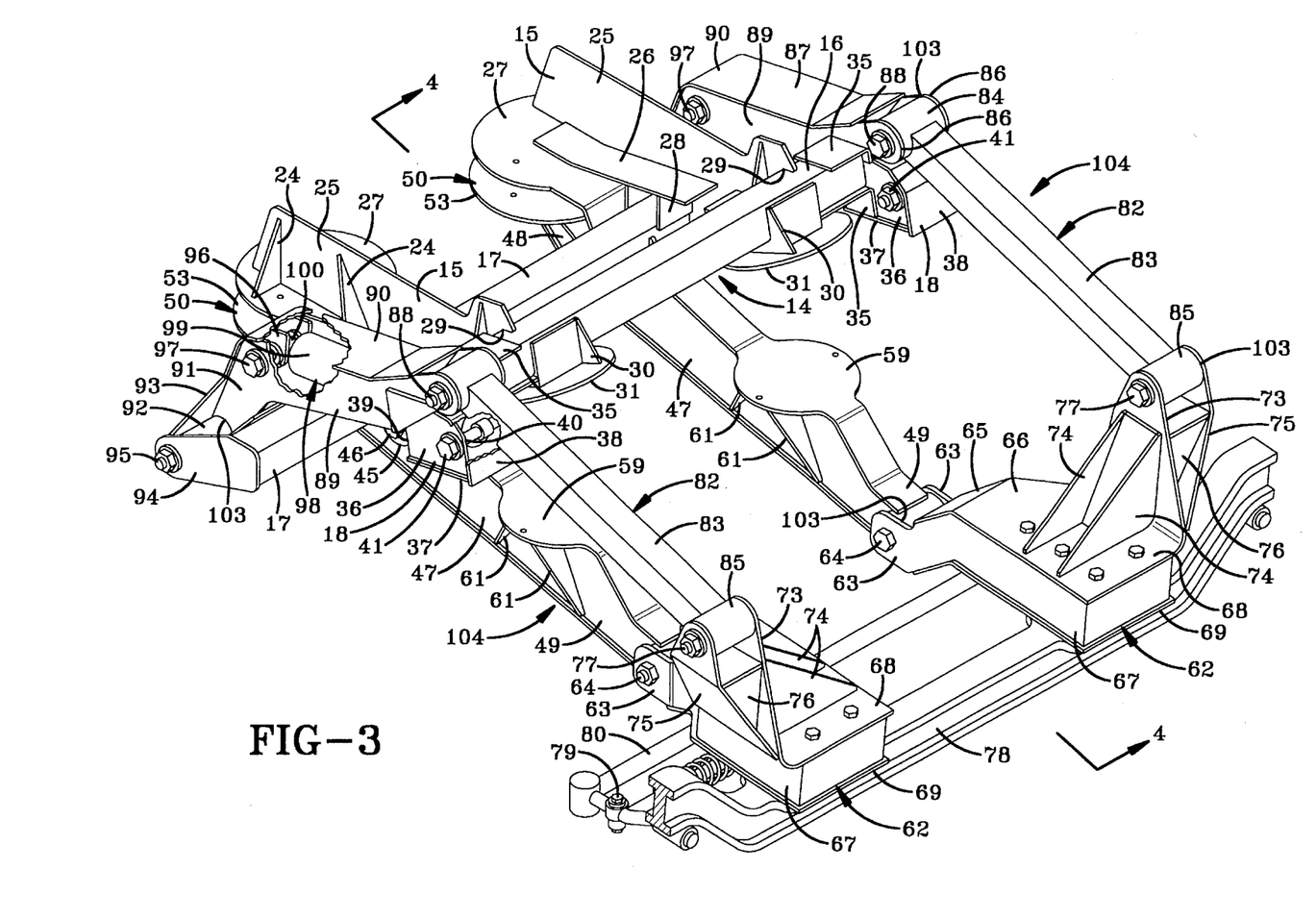
FIG. 3 is a perspective view of the tag axle assembly of the present invention shown with portions cut away and in section, and with the tires and air springs removed.

Tag axle assembly 1, as more specifically shown in FIGS. 2 and 3, broadly includes a pair of tire assemblies (one shown) 11, and a stationary support or assembly frame indicated generally at 14, which includes a pair of parallel and spaced apart hanger brackets 15, an upper cross tube 16, a square cross-sectional lower cross tube 17 and a pair of mounting cases or boxes 18 (FIG. 3).

Hanger brackets 15 of frame 14 are parallel and spaced apart. Each hanger bracket 15 is formed with a vertical plate 25 and an inclined plate 26 substantially perpendicular to vertical plate 25. A round upper lift spring mount 27 is welded to the forward end of each hanger bracket 15. A plurality of strengthening gussets 24 extend between vertical plates 25 and upper lift spring mounts 27 to support upper air spring plates 27. Each inclined plate 26 includes a pair of downwardly extending, parallel and spaced apart weld brackets 28. The distance between weld brackets 28 is substantially equal to the width of lower cross tube 17.

Lower cross tube 17 thus fits between weld brackets 28, and is attached thereto via any convenient attachment means, such as by welding. Lower cross tube 17 is thus rigidly secured to each hanger bracket 15, and is perpendicular thereto. Vertical plate 25 of each hanger bracket 15 is formed with a recess 29 at the rear end thereof. Each recess 29 is complementary shaped to the exterior of upper cross tube 16 which is welded into recess 29 and is perpendicular to hanger brackets 15. A U-shaped bracket 30 (FIG. 3) extends around upper cross tube 16 and is welded thereto. A round upper suspension spring mount 31 is welded to each U-shaped bracket 30 for purposes which will become apparent below. A pair of flanges 35 (FIG. 3) is welded on opposite sides of each end of upper cross tube 16 for receiving a mounting box 18 such that each mounting box 18 is supported from end flanges 35 adjacent each end of upper cross tube 16. Each mounting box 18 includes a pair of parallel and spaced apart sidewalls 36, a bottom wall 37, an end wall 38 and an open end 39. Sidewalls 36 are formed with axially aligned holes for receiving a mounting pin 41.

A pair of pivot brackets 45 (FIG. 2) are welded to lower cross tube 17 adjacent each hanger bracket 15. Each pair of pivot brackets 45 extends downwardly from lower cross tube 17 and is formed with axially aligned holes for receiving a primary pivot pin 46. Each primary pivot pin 46 is mounted in a bushing 46A to impart roll flexibility and stability to tag axle assembly 1. A rocker beam 47 having a front end 48 and a rear end 49 fits between each pair of pivot brackets 45 intermediate front and rear ends 48 and 49, respectively. Each primary pivot pin 46 passes through the pair of pivot brackets 45 and rocker beam 47 to pivotally mount rocker beam 47 to support frame 14.

In accordance with one of the features of the present invention, a lower lift spring mount 50 (FIG. 2) is pivotally mounted to front end 48 of each rocker beam 47 by a pivot pin 51. Each lower lift spring mount 50 includes a pair of parallel and spaced apart downwardly extending flanges 52 welded to a spring plate 53. Each downwardly extending flange 52 is formed with a hole axially aligned with a hole formed in rocker beam 47 for receiving pivot pin 51 such that lower lift spring mounts 50 will rotate about pivot pins 51. An air spring 58 is mounted between each upper lift spring mount 27 and lower lift spring mount 50 whereby expansion of lift spring 58 will cause rocker beam 47 to rotate about primary pivot pin 46. As is apparent from a review of FIGS. 2 and 3, each upper lift spring mount 27 and lower lift spring mount 50 is substantially axially aligned to assure that each lift air spring 58 is mounted therebetween.

Each rocker beam 47 is formed with a lower suspension spring mount 59 intermediate pivot pin 46 and rear end 49. Upper suspension spring mounts 31 and lower suspension spring mounts 59 are substantially aligned for receiving a pair of suspension air springs 60 therebetween. Suspension air springs 60 provides downward force to tag axle assembly 1 when in the ground engaging position. Additionally, a pair of strengthening gussets 61 are mounted below each lower suspension spring mount 59 on both sides of rocker beam 47.

In accordance with another of the main features of the present invention, an axle seat 62 is pivotally mounted to rear end 49 of each rocker beam 47. Axle seats 62 are formed with a pair of forwardly extending mounting flanges 63 formed with axially aligned holes for receiving a hinge pin 64 which extends through each mounting flange 63 and through rear end 49 of rocker beam 47 to securely mount an axle seat 62 to each rocker beam 47. Each axle seat 62 is formed with an upwardly rearward extending inclined portion 65 which terminates in a hollow rectangular box 66. Hollow box 66 and inclined portion 65 define a space 70 as shown in dot-dash lines in FIGS. 2, 5 and 6. Hollow box 66 includes a pair of parallel and spaced apart sides 67, a top 68 and a bottom 69. Top 68 is integrally formed with a vertical flange 73. A pair of strengthening gussets extends between top 68 and vertical flange 73 for stabilizing vertical flange 73 against deflection. An exterior wall 75 is welded to vertical flange 73 and a strengthening wedge 76 is interposed intermediate each exterior wall 75 and vertical flange 73 to provide strength thereto. Both exterior wall 75 and vertical flange 73 are formed with holes for receiving a pivot pin 77, the purpose for which will be described below.

A standard drop axle 78 is mounted to bottom 69 of each axle seat 62. Drop axle 78 is a steerable axle, such that tire assemblies 11 follow the path of travel of vehicle 2. However, drop axle 78 may be non-steerable without departing from the spirit of the present invention. Additionally, tie rod 80 and a steering stabilizers 79 are mounted to axle 78, such that steering stabilizers 79 and tie rod 80 extend forward of drop axle 78 toward vehicle 2. As is apparent from a review of FIGS. 2 and 3, space 70 below axle seat 62 is of sufficient size to house drop axle 78, tie rod 80 and steering stabilizers 79.

An upper articulating beam 82 extends between each axle seat 62 and assembly frame 14. Each upper beam 82 includes a tubular lift bar 83 and an actuator beam 87. Each tubular lift bar 83 (FIG. 3) has a square cross-section and a first end formed with a mounting tube 84 and a second end formed with a mounting tube 85. Each mounting tube 85 is positioned intermediate an exterior wall 75 and vertical flange 73 whereby each pivot pin 77 extends through vertical flange 73, mounting tube 85 and exterior wall 75 to pivotally mount each lift bar 83 therebetween such that upward motion of lift bars 83 will cause interconnected axle seats 62 to rotate about hinge pins 64. Each mounting tube 84 extends intermediate a pair of mounting flanges 86 formed at one end of each actuator beam 87. A pivot pin 88 extends through each mounting flange 86 of actuator beams 87 and mounting tube 84 to pivotally mount lift bars 83 to actuator beams 87.

Each actuator beam 87 includes a pair of parallel and spaced apart sidewalls 89, and a top wall 90. Sidewalls 89 extend downwardly at their forward end to form a pair of mounting flanges 91 (FIGS. 3 and 5). Additionally, a mounting cylinder 92 extends outwardly and rearwardly from each of the pair of mounting flanges 91 with top wall 90 extending downwardly over mounting flanges 91 and mounting cylinders 92 to form strengthening gusset 93. A cap plate 94 is welded to each end of lower cross tube 17 and an inner bracket 102 is mounted on lower cross tube 17 a spaced distance from each cap plate 94. Cap plates 94 and inner brackets 102 are formed with axially aligned holes for receiving a pivot pin 95. Each pivot pin 95 thus extends through a cap plate 94, mounting tubes 92, mounting flanges 91 and an inner bracket 102 to pivotally mount actuator beams 87 to support frame 14.

A pair of inner flanges 96 is mounted intermediate sidewalls 89. Sidewalls 89 and inner flanges 96 are formed with axially aligned holes for receiving a bolt 97 (FIG. 3). In accordance with another of the features of the present invention, a pair of linear actuators 98 extend between actuator beams 87 and mounting boxes 18. Each actuator 98 includes a cylinder 99 pivotally mounted on mounting pin 41, and a piston 100 pivotally mounted on bolt 97 intermediate inner flanges 96. Inner flanges 96 prevent lateral movement of piston 100 on bolt 97 and add strength to actuator beam 87. Fluid pressure exerted against pistons 100 will extend the linear distance between mounting pins 41 and bolts 97, thus causing actuator beams 87 to rotate about pivot pins 95 which will raise lift bars 83 causing axle seats 62 to rotate about hinge pins 64 relative to rocker beams 47. Linear actuators 98 may be hydraulically or pneumatically operated without departing from the spirit of the present invention.

As is apparent from a review of FIGS. 2 and 3, vertical flanges 73, upper articulating beams 82, rocker beams 47 and associated mounting flanges 91, and axle seats 62 form a pair of kinematic parallelograms 104 (FIG. 3), the purpose for which will be discussed in more detail hereinbelow.

Pivot pins 77, 88, 64 and 95 are provided with an elastomeric bushing 103 (FIG. 3) to allow compliances and rotation of tag axle assembly 1. Tag axle assembly 1 is mounted to the rear of a vehicle as shown particularly in FIG. 1 by aligning vertical plates 25 with rear portion 5 of frame rails 4 such that inclined plates 26 are complementary related to rear portions 5. Tag axle assembly 1 may be mounted to vehicle 2 by a variety of methods including welding, but stationary support frame 14 of tag axle assembly 1 is bolted to vehicle 2 in the preferred embodiment. Support frame 14, in combination with the above mentioned bushings utilized over one or more of the pivot pins, provide a stable articulating tag axle assembly 1.

Referring to FIG. 2, tag axle assembly 1 is shown in the ground engaging position. Tag axle assembly 1 is deployed to this position when vehicle 2 is fully loaded and performs two simultaneous functions. First, tag axle assembly 1 adds an additional axle to which load may be transferred. Additionally, tag axle assembly 1, inasmuch as it extends rearwardly behind the vehicle, extends the distance between the front steering axle and the rearmost load bearing axle, such that weight is distributed over a larger linear road surface area thereby permitting the vehicle to carry larger and heavier loads while remaining in compliance with federal, state and local laws.

When tag axle assembly 1 is in the ground engaging position shown in FIG. 2, lift air springs 58 are compressed and suspension air springs 60 are fully inflated. Suspension air springs 60 provide constant downward force on rocker beams 47. Such constant downward force assures that tag axle assembly 1 will remain in ground engaging contact as vehicle 2 traverses uneven terrain. Additionally, as tire assemblies 11 move into a depression, suspension air springs 60 will expand, but to only a limited degree. Actuator beams 87 includes a stop section which is located adjacent mounting box 18 when in the ground engaging position which contacts the top of each mounting box 18, to prevent further downward travel of actuator beams 87 and consequently of interconnected axle 78. As such, mounting boxes 18 and actuator beams 87 interact to provide a positive stop to prevent downward travel of tag axle assembly 1 past a predetermined position. Additionally, as tag axle assembly 2 moves vertically between the position wherein tire assemblies 11 are in a hole or depression in the ground, or when tire assemblies 11 are moving over an obstacle, parallelograms 104 assure that regardless of the vertical position of tire wheel assemblies 11 and axle 78, tag axle assembly 1 will maintain a constant caster angle relative to the ground to assure that the tires will not scuff causing damage to the tire, and possibly to vehicle 2 or tag axle assembly 1.

Figure 4:
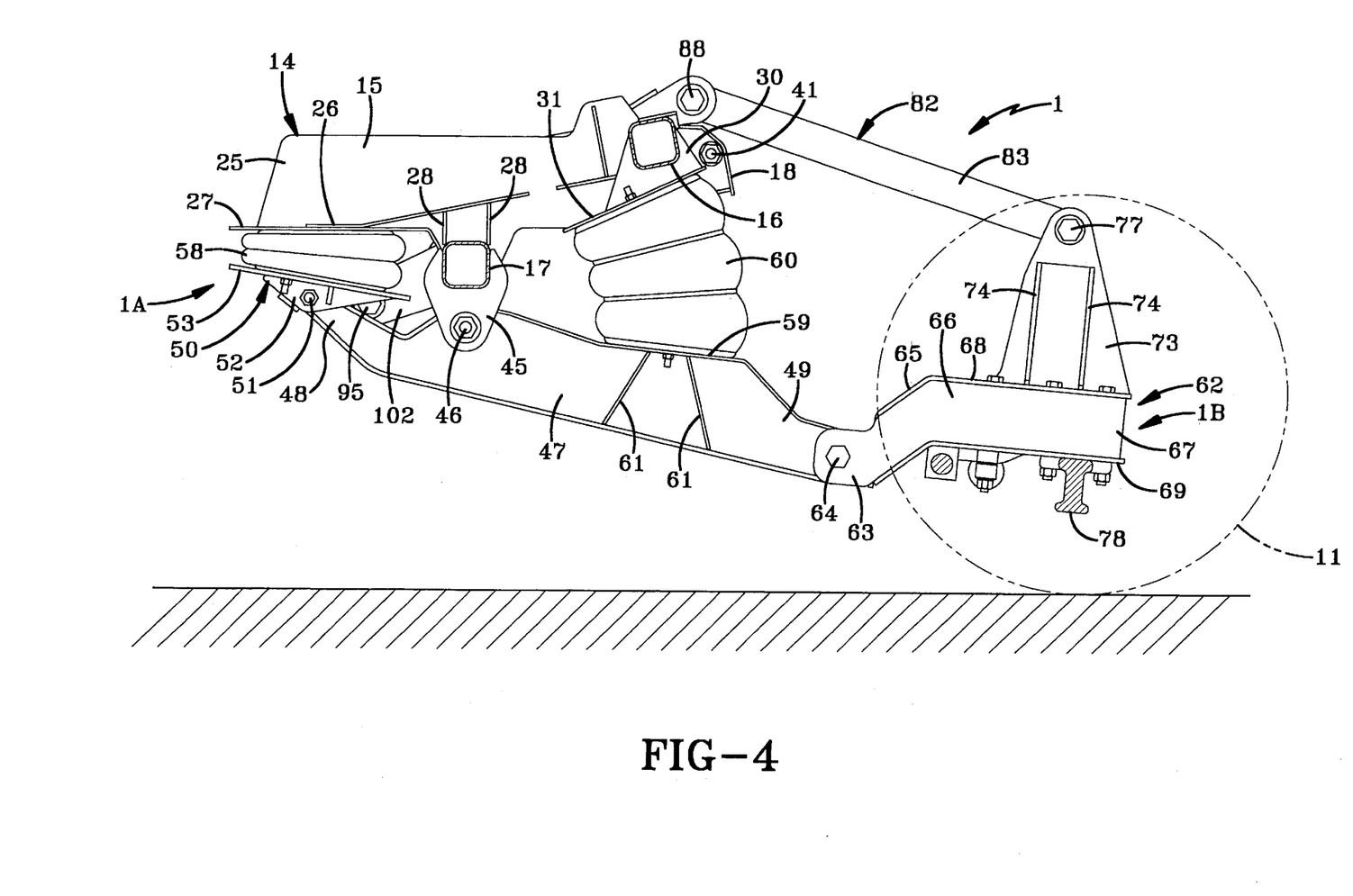
FIG. 4 is a sectional view taken substantially along line 4—4, FIG. 3 shown with the air springs installed, and with the tire in dot-dash lines.

Referring next to FIG. 5, tag axle assembly 1 is shown in an intermediate position with lift air springs 58 in the expanded position, and with suspension air springs 60 in the collapsed position. In this position, lift air springs 58 have expanded to rotate rocker beams 47 about primary pivot pins 46, while simultaneously lower lift spring mounts 50 rotate about pivot pins 51 (FIGS. 4 and 5) until lower lift spring mounts 50 and upper lift spring mounts 27 are substantially parallel. In this manner, the full lift capacity of lift air springs 58 is utilized. Still referring to FIG. 5, as rocker beams 47 rotate about respective primary pivot pins 46, lift bars 83 are moved upwardly due to their interconnection with rocker beams 47 and axle seats 62. However, actuator beams 87 remain positioned adjacent upper cross tube 16 while lift bars 83 pivot about pivot pins 88. Rocker beams 47 rotate, and actuator beams 87 remain positioned adjacent upper cross tube 16 while lift bars 83 pivot about pivot pins 88 because of the kinematic parallelogram movement of parallelogram 104. As such, parallelogram 104 remains assures that tire assembly 11 remains at a constant caster angle when in the positions shown in both FIGS. 2 and 5.

Referring next to FIG. 6, tag axle assembly 1 is shown in a non-ground engaging position with lift springs 58 in the fully inflated position, and with linear actuators 98 in the expanded position whereby the distance between mounting pins 41 and bolts 97 is maximized. In this non-ground engaging folded position, rocker beams 47 are rotated about primary pivot pins 46 by the inflation of lift air springs 58 to the position shown in FIG. 5. Additionally, as fluid pressure is applied against pistons 100 of linear actuators 98, the pistons move forward and apply pressure against each mounting pin 41 which extend through mounting boxes 18. Movement of pistons 100 is possible only by the continued movement of interconnected actuator beam 87. As linear actuators 98 expand and pistons 100 move forward, actuator beams 87 rotate about pivot pins 95 moving interconnected pivot pins 88 and lift bars 83 upwardly and forward. Upward movement of lift bars 83 moves pivot pins 77 and interconnected axle seats 62 upwardly and forward. As axle seats 62 move upwardly, they rotate about hinge pins 64 relative to rocker beams 47. Such movement causes axle seats 62, interconnected axle 78, and tire assemblies 11 to move upwardly and forwardly out of ground engaging position, and into the folded position shown in FIG. 6. In this position, a section of vertical flange 73 and exterior wall 75 rest against mounting box 18 to provide a positive stop for the forward motion of axle seats 62.

As shown in FIGS. 2, 5 and 6, space 70 positioned below hollow box 66 permits tie rod 80 and steering stabilizers 79 to be mounted forward of axle 78. Tie rod 80 and steering stabilizers 79 thus do not increase the overall height of tag axle assembly 1 when in the non-ground engaging position shown in FIG. 6. Tie rod 80 and steering stabilizers 79 are thus not only protected from harm via the movement of vehicle 2, but in accordance with one of the main features of the present invention, positioning tie rod 80 and steering stabilizers 79 forward of axle 78 within space 70 permits further free movement of cement delivery chute 7 etc. when tag axle assembly 1 is in the non-ground engaging folded position shown in FIG. 6. Additionally, actuator beams 87 are formed complementary to fenders 10 to assure that no interference occurs therebetween when tag axle assembly 1 is in the raised non-ground engaging folded position. Further, the flexibility of tag axle assembly 1 may be varied by increasing the spring rate of bushings 46A without departing from the spirit of the present invention.

Regarding assembly frame 14 (FIG. 3), upper cross tube 16 is located directly over suspension air springs 60 to provide frame structure which increases lateral stability, and increases resistance to lateral and torsional stress. Additionally, inasmuch as suspension air springs 60 are positioned inwardly or parallelograms 104, the force acting on suspension air springs 60 creates a bending moment about parallelograms 104. Upper cross tube 16 thus provides structural support against bending forces caused by loads acting on suspension air springs 60 of tag axle assembly 1. Similarly, lower cross tube 17 is positioned directly over primary pivot pins 46 to increase the lateral stability of tag axle assembly 1 by substantially reducing the likelihood of lateral deflection of rocker beams 47 on primary pivot pins 46. As such, assembly frame 14 provides a rigid structure to which the remaining elements of tag axle assembly 1 may be mounted while reducing the possibility of lateral and longitudinal deflection relative to vehicle 2 caused by strains imparted to tag axle assembly 1 in both the ground engaging position of FIG. 2, and the non-ground engaging position of FIG. 6.

Accordingly, the improved tag axle assembly is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved tag axle assembly is constructed and used, the characteristics of the construction, and the advantageous, new and useful results obtained; the new and useful structures, devices, elements, arrangements, parts and combinations, are set forth in the appended claims.

We claim:

1. A tag axle assembly having a length for mounting on a frame of a vehicle, comprising:

an assembly frame adapted to be mounted on the vehicle frame;

a pair of spaced rocker beams each having a first end and a second end;

primary pivot means for pivotally mounting the rocker beams on the assembly frame;

an axle seat attached to the second end of each rocker beam;

hinge means for hingedly connecting the axle seats on the rocker beams;

an axle mounted on and extending between the axle seats;

first lift means extending between the assembly frame and the rocker beams for pivotally moving the rocker beams on the assembly frame;

suspension spring means extending between the rocker beams and the assembly frame for supporting load; and actuator means operatively connected between the assembly frame and the axle seats for expanding outwardly to move the axle out of a ground engaging position and into a non-ground engaging position.

2. A tag axle assembly as defined in claim 1 in which the actuator means includes a pair of upper articulating beams, and at least one actuator; in which the at least one actuator extends between the upper articulating beam and the assembly frame to move the tag axle assembly from the ground engaging position to the non-ground engaging position upon the actuator expanding outwardly.

3. A tag axle assembly as defined in claim 2 in which each of the articulating beams includes a pair of actuator beams, a first pivot pivotally mounting each actuator beam to the assembly frame, a pair of lift bars, second pivots pivotally mounting the lift bars to the axle seats, and third pivots pivotally connecting the lift bars to the actuator beams; in which there are a pair of actuators; and in which each actuator is attached to one of said actuator beams whereby expansion of the actuators decrease the distance between the first and second pivots.

4. A tag axle assembly as defined in claim 3 in which the tag axle assembly includes a front and a rear, and in which the actuators expand toward the front of tag axle assembly.

5. A tag axle assembly as defined in claim 3 in which each actuator beam houses one of said actuators when the axle is in the ground engaging position.

6. A tag axle assembly as defined in claim 3 in which each linear actuator has a first end and a second end; in which the tag axle assembly has a front and a rear; in which the first end of each linear actuator is mounted on the assembly frame rearward of the first lift means; and in which the second end of each actuator is mounted on the actuator beam whereby expansion of the linear actuators move the tag axle assembly out of the ground engaging position causing pivotal movement of the axle seats relative to the rocker beams about the hinge means to decrease the length of the tag axle assembly.

7. A tag axle assembly as defined in claim 6 in which the hinge means is a pair of pivot pins.

8. A tag axle assembly as defined in claim 3 in which the actuators are pneumatic actuators.

9. A tag axle assembly as defined in claim 3 in which the actuators are hydraulic actuators.

10. A tag axle assembly as defined in claim 3 further comprising a pair of steering stabilizers and a tie rod; and in which the stabilizers and tie rod are mounted on the axle intermediate the axle and the vehicle.

11. A tag axle assembly as defined in claim 3 in which the first lift means is a pair of air springs extending between the rocker beams and the frame.

12. A tag axle assembly as defined in claim 11 in which the primary pivot means is positioned on each rocker beam intermediate the associated lift air spring and the suspension spring means.

13. A tag axle assembly as defined in claim 12 in which the suspension spring means is a pair of air springs.

14. A tag axle assembly as defined in claim 3 in which a lower spring plate is pivotally mounted on the first end of each rocker beam; and in which the first lift means is mounted on said lower spring plate.

15. A tag axle assembly as defined in claim 3 in which the rocker beams are parallel and spaced apart; in which the assembly frame is formed with cross beams; and in which an upper cross beam extends over the suspension air springs in a direction transverse to the rocker beams.

16. A tag axle assembly as defined in claim 3 in which the assembly frame is formed with a lower cross beam; and in which said lower cross beam extends adjacent the primary pivot means in a direction transverse to a longitudinal axis of the rocker beams.

17. A tag axle assembly as defined in claim 15 in which the upper beam includes a stop section; and in which the assembly frame includes a stop section; and in which the upper beam stop section and assembly frame stop section interact to provide a positive stop for the tag axle assembly when in the ground engaging position.

18. A tag axle assembly as defined in claim 15 in which the upper beam includes a stop section; in which the axle seat includes a stop section; and in which the upper beam stop section and axle seat stop sections interact to provide a positive stop for the tag axle assembly when in the non-ground engaging position.

19. A tag axle assembly as defined in claim 3 in which at least one of the first pivots, second pivots and third pivots includes a bushing for stabilizing the tag axle assembly.

20. A tag axle assembly as defined in claim 3 in which the axle is steerable.

21. A tag axle assembly as defined in claim 3 in which the axle is non-steerable.

22. A tag axle assembly as defined in claim 15 in which the axle beams, rocker beams and upper articulating beams form a pair of kinematic parallelogram means for maintaining constant caster angle.

23. A tag axle assembly as defined in claim 22 in which the axle beam includes a vertical flange; and in which the upper beam is mounted to the vertical flange when forming the pair of kinematic parallelogram means for maintaining constant caster angle.

* * * * *